Nov. 10, 1942.     T. ULRICH     2,301,593
VEHICLE STRUCTURE
Filed May 28, 1940
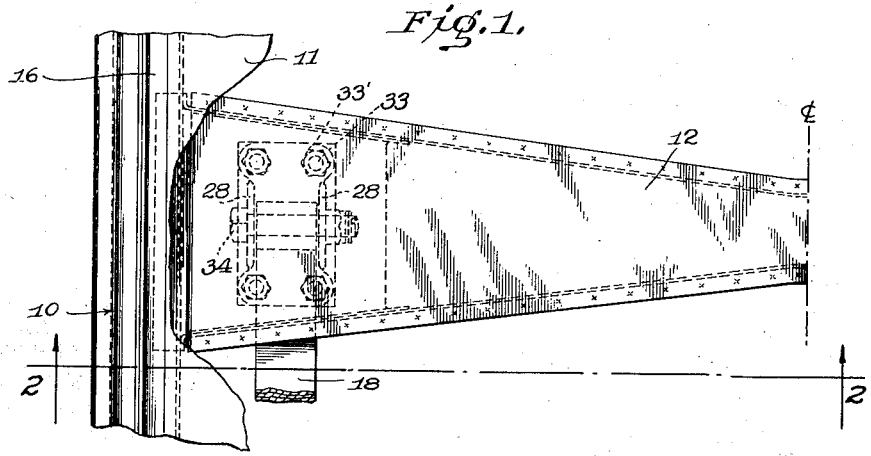
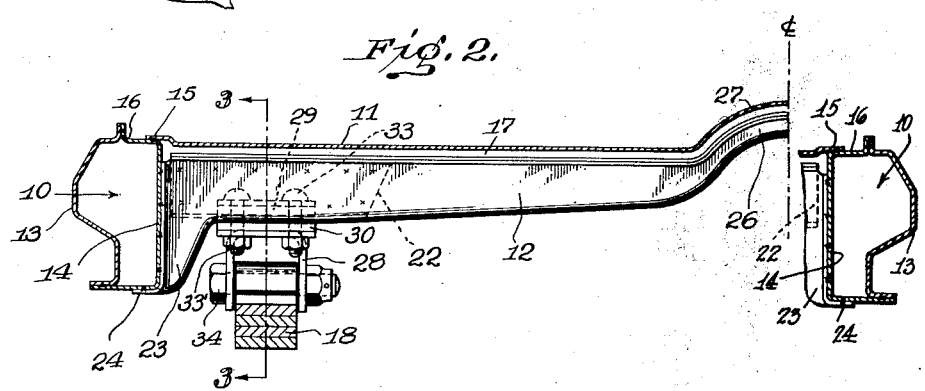
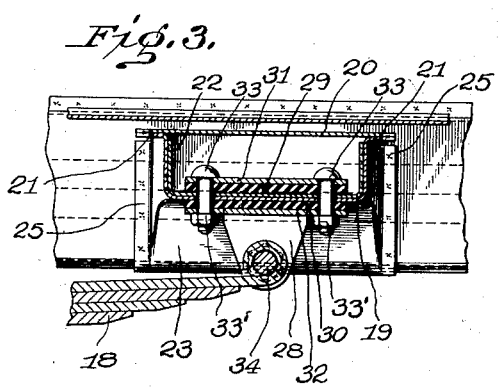
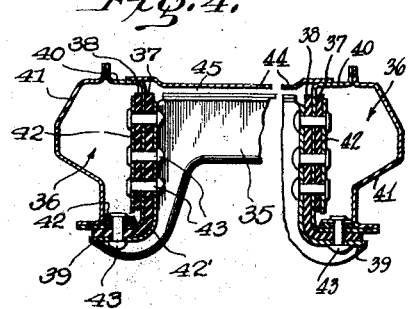
INVENTOR
Theodore Ulrich
BY John P. Verbos
ATTORNEY Patented Nov. 10, 1942

2,301,593

UNITED STATES PATENT OFFICE 2,301,593

VEHICLE STRUCTURE

Theodore Ulrich, Detroit, Mich., assignor to Edward G. Budd Manufacturing Company, Philadelphia, Pa., a corporation of Pennsylvania Application May 28, 1940, Serial No. 337,568

7 Claims. (Cl. 280—106.5)

This invention relates in general to vehicle body-underframe and/or chassis structures having for its principal object the provision of means for the prevention of the transmission of vibrations from the running gear or other accessories of a vehicle to the body thereof.

One feature of the invention consists in providing a combined body and chassis structure with sound and vibration damping means between a cross member of the underframe or chassis and the spring suspension system or between the cross member of the vehicle.

Further features of the invention reside in the combination and arrangement of parts and in the details of construction hereinafter described and claimed, it being understood that various changes may be made within the scope of what is claimed without departing from the spirit of the invention.

The invention will be best understood by reference to the drawing wherein:

Figure 1 is a fragmentary plan view on one side of the longitudinal center line of a chassis and body underframe structure, including a side sill, a cross member, an adjacent body floor portion and of one end of a spring of a vehicle embodying the invention;

Figure 2 is a fragmentary transverse sectional view, taken on the line and as viewed in the direction of the arrows 2—2 of Figure 1 but showing also the members near the other side of the structure;

Figure 3 is a sectional view, taken on the line and as viewed in the direction of the arrows 3—3 of Figure 2, and Figure 4 is a fragmentary sectional view similar to Figure 2, but showing a modified form of the invention.

The present invention contemplates the prevention of noises and vibrations arising in a vehicle such as an automobile from moving parts, for example, from the motor, wheels, springs, and more specifically the elimination of noise and vibration in the floor panel of present day vehicles of the so-called combined body and chassis type. Although the use of sound-deadening material in contact with the large panels of a vehicle generally suffices to mute their critical frequencies, in practice, certain conditions are frequently encountered where these expedients prove inadequate. It has been found, for example, that the vibrations created by the rear tires of an automobile in rapid motion over a roadway are a potent source of noises which are readily transmitted through the springs to the body. The proximity of the adjacent floor pan, which functions in these cases as a large amplifying diaphragm, has made the isolation and prevention of such noises a difficult and important problem. The method and means employed in this invention are considered to provide an adequate solution to this problem.

In the drawing, similar characters of reference indicate corresponding parts in the several views. Since the constructions depicted in Figures 1, 2 and 4 are substantially symmerical relative to the longitudinal center line of the vehicle, a description of the parts on one side thereof, it is understood, will suffice for a clear comprehension of the parts on the other.

The numeral 10 designates generally the longitudinally extending side sills of a vehicle chassis, 11 the floor panel, and 12 a rear box-sectional cross member joining the said side sills.

As best shown in Fig. 2, side sills 10 present in section, a box-like configuration, and being for example, composed of two channel-like members 13, 14, having their opposite edges welded together the inner member 14 being secured to the end flanges of the cross member 12, as described more particularly hereinafter.

The floor panel 11 of the body portion of the vehicle is welded, as at 15, to an upper portion 16 of the inner side sill members 14. A free space 17 separates and isolates the said floor panel 11 from the transverse structure 12 which latter is adapted to support a rear spring 18. The above-referred to space 17, in conjunction with other coacting structure, constitutes an important feature of the invention.

The transverse member 12 consists of an upwardly facing U-sectional member 19 and a cover plate 20 fastened as by spot welding to marginal flanges 21 of the latter, the said member 12 presenting a closed box section. The member 19 is reinforced near each end by a second channel member 22 nested within and welded to its inner surface. The end portions of the member 19 are extended downwardly, as at 23 and overlap and are welded to the lower wall and the inner wall of the side sill members 14 by means of projections or flanges 24, 25. The width of the transverse sill 12 increases from the longitudinal center line towards the ends. Upwardly raised portions 26, 27 of the sill 12 and the floor panel 11 respectively serve for the accommodation of a drive shaft (not shown).

A bracket 28 for the springs 18 is secured to, but insulated from the box-sectional cross member 12 in the following manner: A block 29 of vibration-damping material is arranged on the top of the inner channel member 22, and a similar block 30 of the same material is engaged against the bottom of the member 19, these blocks being engaged on their outer faces respectively by a plate 31 and the base 32 of the bracket 28. These overlapping members are clamped together by screw bolts 33 passed through registering holes in the said members, plates and blocks and by nuts 33'. The spring 18 is accommodated by conventional means such as the screw bolts 34 between the depending arm of the bracket 28.

In the modified form of the invention depicted in Figure 4, the box-sectional cross member, therein designated by the numeral 35 is insulated from direct contact with the side sills 36 through the intermediary of blocks 37, 38, 39 of vibration-damping material. The side sills 36, which are similar to the sills 19 in the other form of the invention, are individually composed of two channel members 40, 41 fastened together. The blocks 37, 38, 39 of vibration-damping material being clamped to opposite sides of the sill member 40 by any suitable means between plates 42, 42 and the flange 42' of the cross sill 35 such as by rivets 43.

It will be observed that the cross member 35 of the modified form of the invention is entirely insulated from the side sills 36 and the floor panel 44 by the blocks 37, 38 of vibration-damping material and the air space 45 between the said cross member and floor panel. The spring suspension system or mount, if any, (not shown in Fig. 4) may be the same as that illustrated in Figs. 1, 2 and 3, or any conventional spring mounting may be attached to the cross member 35.

It is to be understood that the invention may be embodied in other specific forms and is in no way restricted to the specific details of the embodiment shown in the drawing and described in the foregoing. It is for example, obvious that the two embodiments shown in the drawing may be used in combination as to increase the vibration or sound-damping effect.

What I claim as new and desire to secure by Letters Patent is:

1. In a body underframe or chassis structure of a vehicle, the combination of a hollow section sill having a bottom wall and generally upright side walls, an inner side wall and an outer side wall, a floor panel connected to said sill, said sill projecting downwardly from said floor panel, and means projecting from and being fastened to said bottom wall and said inner upright wall, said means extending transversely to said sill and being adapted for connection of an adjoining vibration creating or transmitting vehicle part such as a spring suspension system, said means being arranged beneath and close to but slightly spaced substantially throughout from said floor panel.

2. In a body underframe or chassis structure of a vehicle, the combination of longitudinally extending sills, a floor panel connected to said sills, transversely extending means arranged between said sills and providing a connection for a spring suspension system, said means being arranged beneath and close to but slightly spaced substantially throughout from said floor panel, means for connecting said first-named means and said sills, and comprising vibration-damping material inserted between the said sills and the said first-named means.

3. In a body and chassis structure of the character described, the combination of a side sill, a floor panel structurally connected to the sill so that the latter extends at least partly downwardly from the floor panel, and a closed box section member projecting generally horizontally from the inner side of the sill and providing means for connecting a spring suspension system thereto, said member being arranged immediately beneath but being separated by a narrow space substantially throughout from the floor panel.

4. In a body underframe or chassis structure of a vehicle, the combination of a side sill, a floor panel structurally connected to the sill, a member projecting from the sill and providing means for connecting a spring suspension system thereto said member being arranged immediately beneath but being separated by a small space substantially throughout from the floor panel, and a sound deadener arranged between the member and spring suspension system.

5. In a body underframe or chassis structure of a vehicle, the combination of a pair of longitudinal side sills, a floor panel connected to said sills, said sills projecting downwardly from said panel and comprising a generally downwardly extending wall and a generally horizontally extending bottom wall, and a cross member extending transversely between said sills, said cross member being fastened to said vertical wall and said bottom wall of each sill, said member being adapted for connection of an adjoining vehicle part such as a spring suspension system, said member being arranged closely beneath but being slightly spaced substantially throughout from said floor panel, a sound deadener being arranged between said member and said sills.

6. In a body underframe or chassis structure of a vehicle, longitudinally extending side sills, a floor panel structurally connected to said sills, a hollow section cross member extending between said sills, said cross member underlying but being slightly spaced from said floor panel, said longitudinal sills comprising a vertical wall and a horizonal wall, the ends of said cross member being adapted to overlie, at least partly, said vertical and horizontal walls of said sills on a comparatively great surface, means for connecting said ends of said cross member to said walls of said side sills, said means comprising vibration-damping material inserted between said ends and said walls, said cross members being adapted for the connection of an adjoining vibration creating or transmitting vehicle part, such as a spring suspension system for the road wheels.

7. In a body underframe or chassis structure of a vehicle, a sill comprising a wall, a floor panel connected to said sill, a member projecting from and extending transversely to said sill and being adapted for connection of an adjoining vehicle part such as a spring suspension system, said member underlying but being slightly spaced from said floor panel, means for connecting one end of said member to said sill, said means comprising a layer of vibration damping material inserted between said end of said member and one surface of one wall of said sill, a second layer of vibration damping material covering the opposite surface of said sill wall, a plate of rigid material such as metal covering said second layer, and means such as rivets clamping the end of said member and said layers from both sides against said sill wall.

THEODORE ULRICH.